United States Patent [19]

Robbins, III

[11] Patent Number: 5,509,579

[45] Date of Patent: Apr. 23, 1996

[54] NO DRIP DISPENSING CAP

[76] Inventor: Edward S. Robbins, III, 2802 E. Avalon Ave., Muscle Shoals, Ala. 35661

[21] Appl. No.: 221,082

[22] Filed: Mar. 31, 1994

Related U.S. Application Data

[63] Continuation-in-part of Ser. No. 76,132, Jun. 14, 1993, Pat. No. 5,411,186, which is a continuation-in-part of Ser. No. 288,896, Aug. 10, 1994, Pat. No. 5,509,582, which is a continuation of Ser. No. 47,086, Apr. 16, 1993, abandoned, which is a continuation-in-part of Ser. No. 237,336, May 3, 1994, Pat. No. 5,465,871, which is a continuation of Ser. No. 979,042, Nov. 19, 1992, abandoned.

[51] Int. Cl.$^6$ .................................................. B67D 1/16
[52] U.S. Cl. .......................... 222/109; 222/158; 222/424; 222/441; 222/456
[58] Field of Search ........................... 222/109, 154, 222/156, 158, 424, 424.5, 425, 441, 454, 456

[56]  References Cited

U.S. PATENT DOCUMENTS

| | | | |
|---|---|---|---|
| 1,273,012 | 7/1918 | Souther | 222/456 |
| 1,714,368 | 5/1929 | Hobson . | |
| 1,802,284 | 4/1931 | Stoddard | 222/572 X |
| 2,214,437 | 9/1940 | Punte et al. | 206/42 |
| 2,339,644 | 1/1944 | Lucas | 222/425 |
| 2,370,820 | 3/1945 | Stott | 222/456 |
| 2,449,285 | 9/1948 | Ekstrom | 220/255 X |
| 2,804,103 | 8/1957 | Wall | 141/381 |
| 2,811,281 | 10/1957 | Donovan | 222/154 X |
| 2,840,124 | 6/1958 | Greene | 222/212 X |
| 2,844,266 | 7/1958 | Hofe | 215/244 |
| 2,969,167 | 1/1961 | Libit | 222/512 |
| 2,985,343 | 5/1961 | Mask | 222/442 |
| 3,020,659 | 2/1962 | Paulini | 40/302 |
| 3,033,420 | 5/1962 | Thomas et al. | 222/1 |
| 3,140,799 | 7/1964 | Mehr | 222/519 |
| 3,396,875 | 8/1968 | Finch | 222/456 |
| 3,424,355 | 1/1969 | Blumen | 222/450 |
| 3,486,665 | 12/1969 | La Croce | 220/254 X |
| 3,784,884 | 3/1974 | Borie, Jr. | 222/336 |
| 3,860,111 | 1/1975 | Thompson | 206/534 |
| 3,948,105 | 4/1976 | Johnson, Jr. | 73/427 |
| 4,069,935 | 1/1978 | Hampel | 215/203 |
| 4,079,859 | 3/1978 | Jennings | 222/1 |
| 4,083,467 | 4/1978 | Mullins et al. | 222/456 |
| 4,144,989 | 3/1979 | Joy | 222/438 |
| 4,164,301 | 8/1979 | Thayer | 220/253 |
| 4,209,100 | 6/1980 | Uhlig | 215/216 |
| 4,292,846 | 10/1981 | Barnett | 73/427 |
| 4,298,038 | 11/1981 | Jennings | 141/2 |
| 4,318,500 | 3/1982 | Melikian | 222/425 |
| 4,346,823 | 8/1982 | Eppenbach | 222/443 |
| 4,376,497 | 3/1983 | Mumford | 222/153 |
| 4,399,928 | 8/1983 | Klingler | 220/335 |
| 4,544,063 | 10/1985 | Neward | 206/540 |
| 4,550,862 | 11/1985 | Barker et al. | 222/109 |

(List continued on next page.)

FOREIGN PATENT DOCUMENTS

| | | | |
|---|---|---|---|
| 580339 | 8/1958 | Italy . | |
| 613958 | 12/1960 | Italy . | |
| 2145061 | 3/1985 | United Kingdom | 222/454 |
| 2268737 | 1/1994 | United Kingdom | 222/109 |

Primary Examiner—Andres Kashnikow
Assistant Examiner—Joseph A. Kaufman
Attorney, Agent, or Firm—Nixon & Vanderhye

[57] ABSTRACT

A dispenser cap for discharging measured amounts of liquid contents from a container includes an outer cylindrical side wall having upper and lower portions, the lower portion provided with interior surface configuration for securing the cap to a container. An inner cylindrical side wall is spaced radially from the outer cylindrical side wall and at least partially defines a dispensing chamber. A weir panel within the inner cylindrical side wall is configured to provide a weir opening between the container and the dispensing chamber, and a recloseable top is provided which includes an outer peripheral skirt adapted to be telescoped over and secured to the outer cylindrical side wall. The top is pivotally secured to the outer cylindrical side wall radially adjacent but axially spaced from the weir opening.

19 Claims, 8 Drawing Sheets

U.S. PATENT DOCUMENTS

| | | | |
|---|---|---|---|
| 4,580,687 | 4/1986 | Lewis | 215/237 |
| 4,606,481 | 4/1986 | Conti et al. | 222/562 |
| 4,613,057 | 9/1986 | Sacchetti et al. | 221/265 |
| 4,635,828 | 1/1987 | Kaufman | 222/185 |
| 4,643,881 | 2/1987 | Alexander et al. | 220/253 X |
| 4,646,948 | 3/1987 | Jennings | 222/454 |
| 4,691,821 | 9/1987 | Hofmann | 206/216 |
| 4,802,597 | 2/1989 | Dubach | 215/307 |
| 4,930,688 | 6/1990 | Arona-Delonghi | 222/484 |
| 4,961,521 | 10/1990 | Eckman | 222/142.5 |
| 5,011,048 | 4/1991 | Mark | 222/455 |
| 5,064,106 | 11/1991 | Butler et al. | 222/456 |
| 5,085,331 | 2/1992 | Groya et al. | 215/245 |

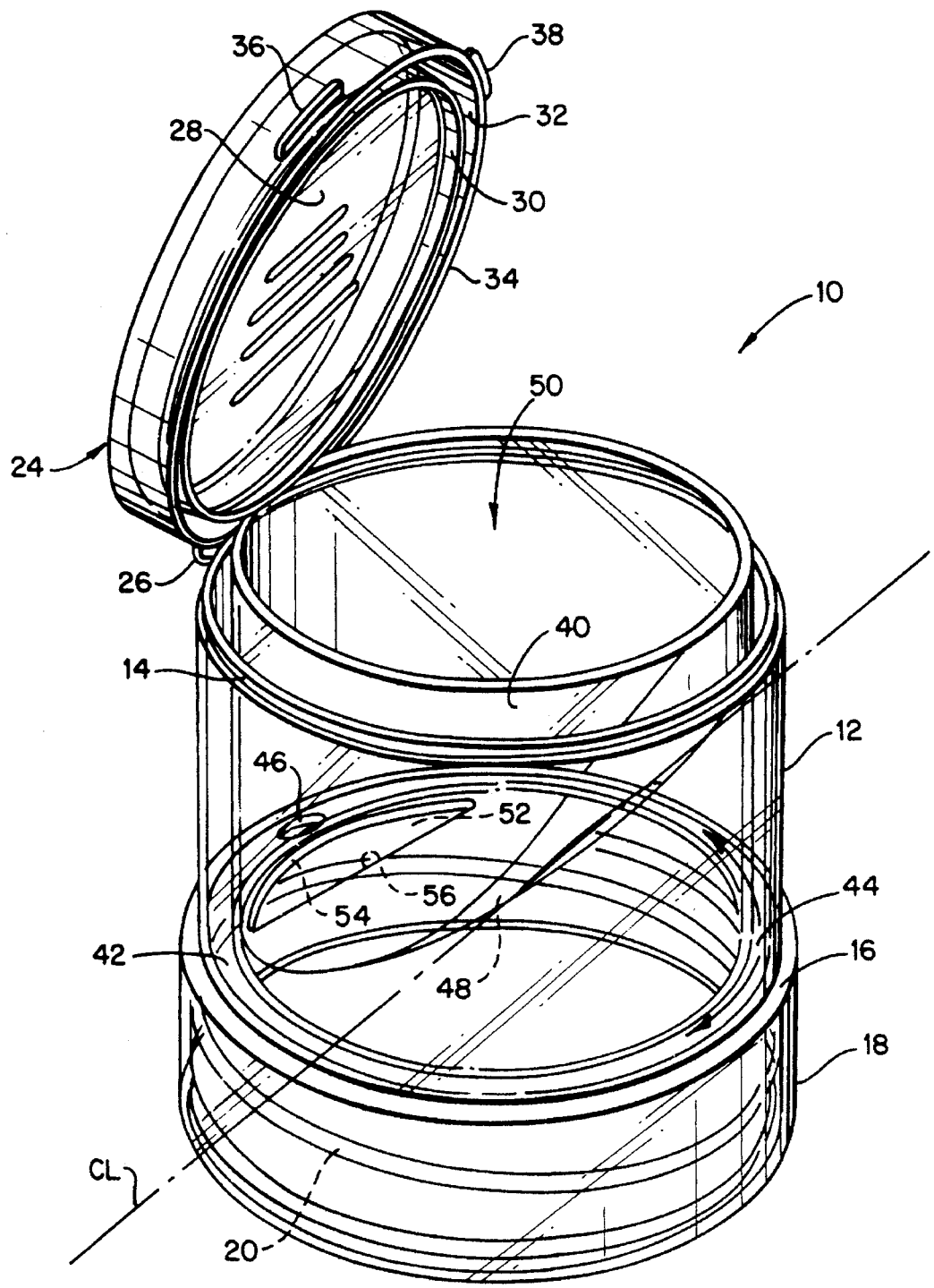

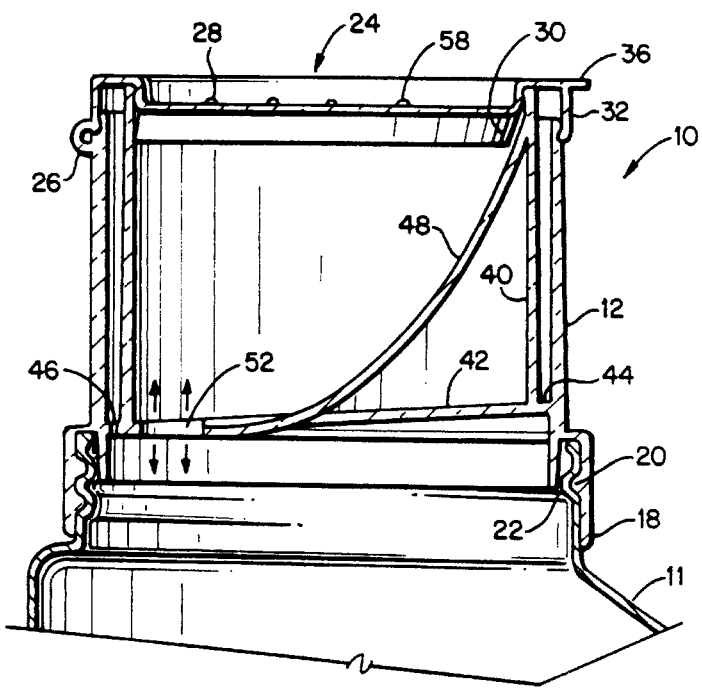

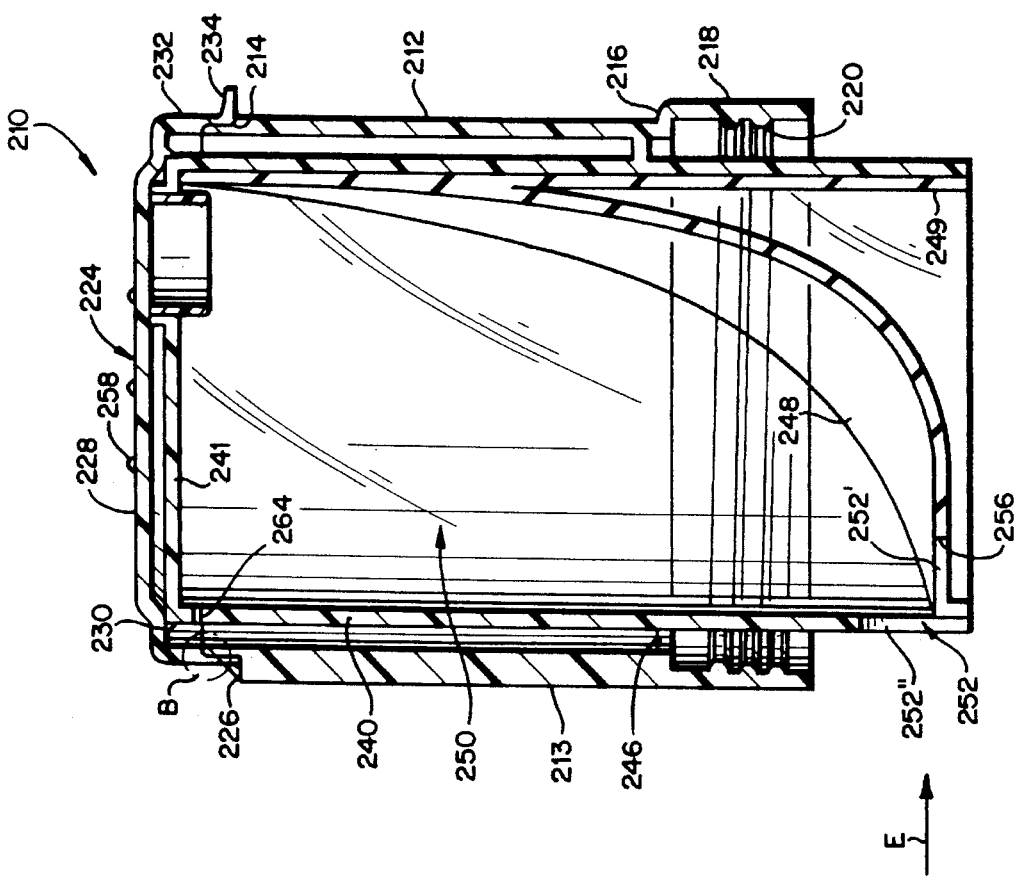
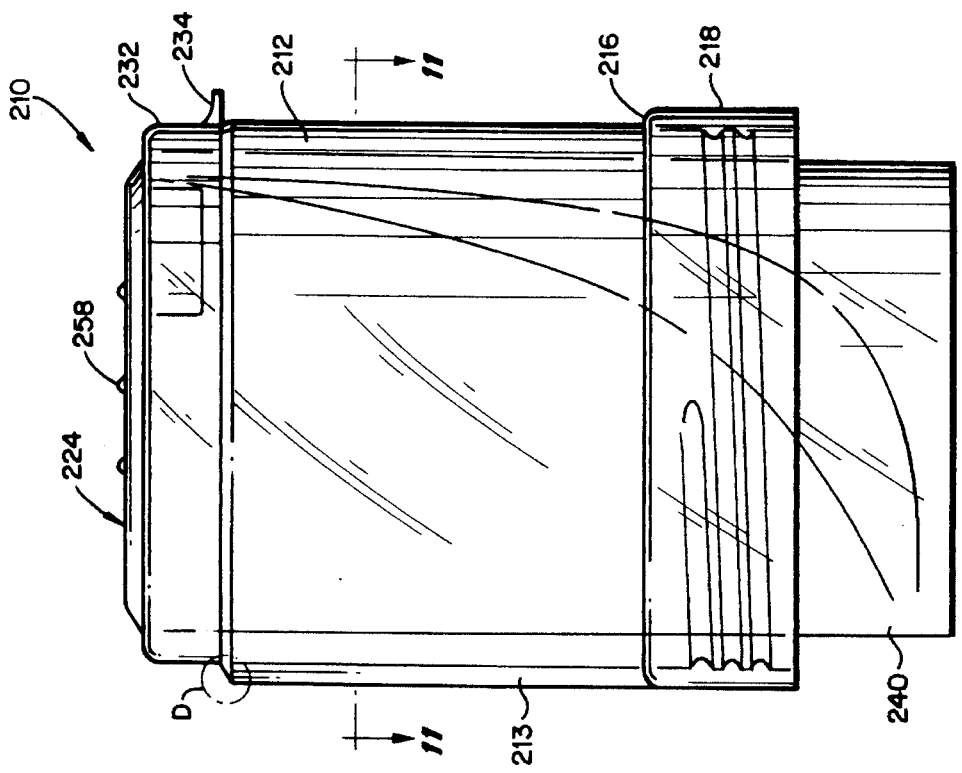

NO DRIP DISPENSING CAP

RELATED APPLICATIONS

This application is a continuation-in-part of my own application Ser. No. 08/076,132, filed Jun. 14, 1993, now U.S. Pat. No. 5,411,186, issued May 2, 1995, which is a continuation-in-part of Ser. No. 08/288,896 filed Aug. 10, 1994, now U.S. Pat. No. 5,509,582 which is a File Wrapper continuation application of Ser. No. 08/047,086 filed Apr. 16, 1993, now abandoned, and which in turn, is a continuation-in-part of commonly owned application Ser. No. 08/237,336 filed May 3, 1994, now U.S. Pat. No. 5,465,871 which is a File Wrapper continuation application of Ser. No. 07/979,042 filed Nov. 19, 1992, now abandoned.

BACKGROUND AND SUMMARY OF THE INVENTION

The present invention relates generally to liquid dispensing containers, and more specifically, to dispensing cap constructions enabling accurately measured amounts of liquid to be dispensed from the container, through the cap.

Dispensing containers are, of coarse, well known and are used in many different industries. One such use is in the detergent industry, and a specific example includes containers for liquid detergents which have removable caps designed with built-in measuring cups. Typically, the caps may be used as measuring cups only upon removal and inversion of the caps.

The present invention eliminates the requirement for removal of the cap before using it as a measuring device by providing a hollow cap with its own built-in measuring chamber. While the incorporation of a measuring function into a container/cap construction for the discharge of desired amounts of container contents is not new (see for example, U.S. Pat. Nos. 1,802,284; 2,804,103; 3,860,111; 4,613,057 and 4,635,828), the present invention provides an improved and simplified structure for accomplishing this result. Thus, this continuation-in-part application discloses a dispensing cap which is particularly useful with liquid detergents or other somewhat viscous liquids which does not require removal of the cap for dispensing measured amounts of the liquid contents. In addition, the cap incorporates anti-drip features which keep the functional elements of the cap free of excess liquid.

In an exemplary embodiment of the invention, the no-drip measuring/dispensing cap comprises a radially outer cylindrical side wall to which a recloseable top is pivotally (and integrally) secured. The lower portion of this outer cylindrical side wall is formed with a slightly larger diameter and is provided with internal screw threads to facilitate attachment of the cap to a similarly threaded container neck or discharge opening.

The cap also includes an inner cylindrical side wall, radially spaced from the outer cylindrical side wall. At its lowermost end, the radially inner side wall is connected to the radially outer side wall by a slightly ramped, annular surface which extends from a high point downwardly in opposite directions to a drain hole located in diametrically opposed relationship to the high point of the ramped surface.

The upper end of the radially inner side wall extends axially above the radially outer side wall and is adapted to seat within (and frictionally engage) a sealing channel formed on the underside of the recloseable top.

The radially inner side wall forms a volumetric measuring chamber defined not only by the inner side wall but also by a weir panel which curves upwardly from a lowermost edge of the inner side wall to the uppermost edge thereof. This panel is provided with a chord-shaped weir opening in the lowermost portion thereof (relative to an upright orientation of the container) which serves as a passage for the liquid moving between the associated container and the measuring chamber in the cap.

The cap is preferably constructed of clear plastic (or other suitable material), and appropriate volume indicators may be provided on the recloseable top. If desired, the indicators may be continued on the inner and/or outer sidewalls, to facilitate the accurate transfer a desired amount of liquid contents to the measuring chamber.

With the recloseable top in the sealed closed position, the container may be tilted downwardly in a direction away from the weir opening, causing liquid to flow through over the weir edge and through the weir opening into the measuring chamber. When the desired amount of liquid has been transferred to the chamber, and with the container remaining in a tilted position (but not tilted to the extent that more liquid passes through the weir opening), the recloseable top is opened, thus discharging the precisely measured amount of liquid contents. It will be appreciated it at the recloseable top is pivoted in vertical alignment with the weir opening so that the liquid within the measuring chamber will flow easily out of the chamber, but liquid within the container will be prevented from entering the chamber because the weir panel acts as a dam, and no additional liquid will flow over the weir edge (unless, of course, the container is severely tilted past the point necessary to discharge the liquid from the chamber).

Any residual liquid remaining on the radially inner side wall which would otherwise drip or flow down the cap exterior, flows instead into the radial space between the inner and outer side walls of the cap. Upon returning the container to an upright position, this residual liquid will flow along the ramped surface, through the drain hole and back into the container.

It should also be noted that the drain hole is radially adjacent the weir opening so that, when liquid is transferred to the measuring chamber through the weir opening, no (unwanted) additional liquid flows through the drain opening into the space between the inner and outer side walls.

In another exemplary embodiment of the invention, a two-piece cap is provided wherein the weir panel is formed as a separate element which can be fitted within the inner cylindrical side wall of the cap. In addition, in this exemplary embodiment, the inner cylindrical side wall is substantially closed at its upper end with the exception of a small round opening radially adjacent the uppermost end of the weir panel (relative to the container in an upright orientation). At the same time, the recloseable top is formed with a round projection adapted to snap fit into the hole in the closed end of the inner cylindrical side wall. In this way, wheat the recloseable top is in the open position, the liquid will be dispensed from the measuring chamber through the small round opening in the upper closed end of the inner cylindrical side wall, so as to allow a more controlled discharge of the measured liquid contents.

In still another exemplary embodiment of the invention, a similar measuring/dispensing cap is provided with an enlarged measuring chamber which extends downwardly below the lowermost edge of the threaded skirt portion of the cap. This third exemplary embodiment also includes a modified weir aperture in combination with a venting arrangement for facilitating the pouring of liquid contents from the container.

Accordingly, in its broader aspects, the invention relates to a dispenser cap for discharging measured amounts of liquid contents from a container comprising an outer cylindrical side wall having upper and lower portions, the lower portion provided with interior surface means for securing the cap to a container, an inner cylindrical side wall spaced radially from the outer cylindrical side wall and at least partially defining a dispensing chamber; a weir panel within the inner cylindrical side wall, configured to provide a weir opening between the container and the dispensing chamber; and a recloseable top including an outer peripheral skirt adapted to be telescoped over and secured to the outer cylindrical side wall, wherein the top is pivotally secured to the outer cylindrical side wall radially adjacent but axially spaced from the weir opening.

From the description which follows, it will be appreciated that this invention combines measuring and anti-drip features in a low cost, easy to manufacture cap. Other objects and advantages will also become apparent.

BRIEF DESCRIPTION OF THE DRAWINGS

FIG. 1 is a perspective view of a dispensing cap in accordance with this invention;

FIG. 2 is a cross-section of the cap shown in FIG. 1;

FIG. 3 is a cross-section similar to FIG. 2, but with the cap and associated container tilted to a position where liquid contents are transferred to the measuring chamber;

FIG. 4 is a cross-section similar to FIG. 3, but with the recloseable top in an open position so that only the measured amount of liquid is discharged from the cap;

FIG. 7 is a side elevation view of a third exemplary embodiment of the invention;

FIG. 8 is a cross sectional view of the cap illustrated in FIG. 7, and taken along the line 8—8 of FIG. 9;

FIG. 2 is an enlarged detail A taken from FIG. 10;

DETAILED DESCRIPTION OF THE DRAWINGS

Figure 5:
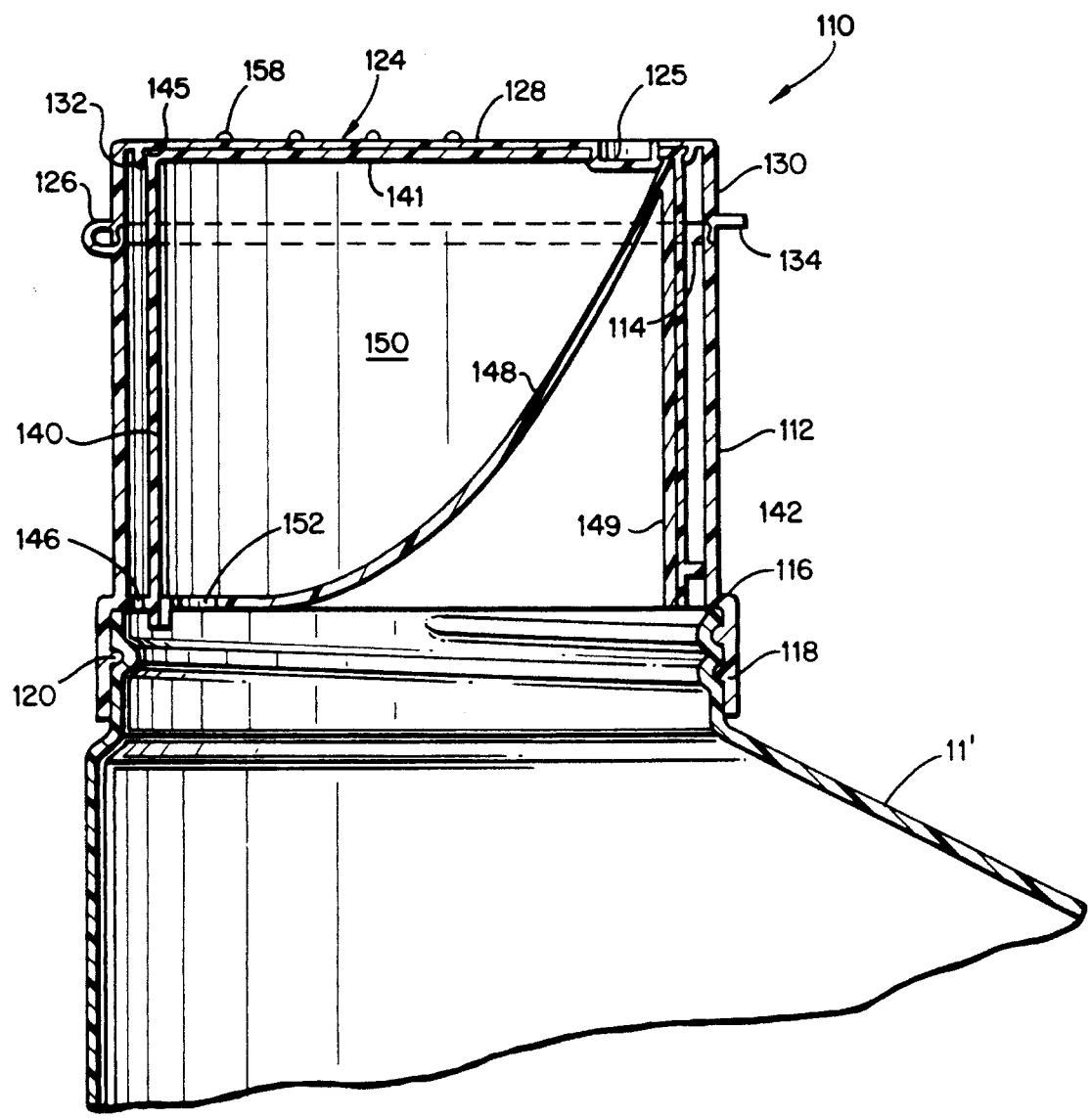
FIG. 5 is a cross section of a cap in accordance with a second exemplary embodiment of the invention.

With reference to FIG. 1, the chap 10 in accordance with this invention includes a radially outer cylindrical sidewall 12 which terminates at an open upper end with an annular groove 14. The side wall 12 is also provided with an annular step or shoulder 16 which establishes a larger diameter for a lower portion 18 of the side wall 12. This lower portion is provided with an interior screw thread 20 which enables the cap 10 to be removably secured to a container 11 (set; FIGS. 2–4 and 6) provided with a complimentary screw thread 22.

An integral, recloseable top 24 is pivotally secured to the side wall 12 at is uppermost edge by an integral or "living" hinge 26. The top 24 is formed with a top wall 28, and integral, radially inner and outer annular skirts 30, 32, respectively, which depend from the to wall 28. The radially outer skirt terminates at an inwardly directed, annular projection 34 which is adapted to snap into the groove 14 when the top 24 is pivoted to a closed position. Other friction fit and/or snap fit arrangement may be utilized to releasably secure the top 24 in a closed position. The racially inner skirt 30 has a specific function described below.

The recloseable top 24 is also provided with a pair of lift tabs 36, 38 on the exterior surface of outer skirt 32 to facilitate opening of the top 24, as will be explained in detail further herein. These tabs may be combined into a single tab, but other similar means may also be provided for the same purpose.

The cap 10 also includes an integral, radially inner cylindrical side wall 40 with an open upper end which extend is axially above the outer cylindrical side wall 12, and which is radially spaced therefrom. These inner and outer cylindrical side wall portions 40 and 12 are connected by an integral, substantially radially oriented ramp surface 42, substantially adjacent the annular step or shoulder 16, as best seen in FIG. 2. The ramp surface 42 extends annularly from a "high point" indicated by reference numeral 44 in opposite directions to a "low point" at a drain hole 46. In other words, the high point 44 and drain hole 46 are diametrically opposed, and it is further noted that the drain hole 46 and living hinge 26 are in substantial axial alignment.

For convenience, the cap 10 may be considered as having upper and lower portions, as defined generally by the annular step or shoulder 16. The cap lower portion 18, as already noted constitutes an attachment portion of the cap. That portion of the cap above the step or shoulder 16 is formed with an internal measuring chamber, as described below. Within the inner cylindrical portion 40, there is an integral, curved weir panel 48 which is circular in plan, and which defines, together with the inner cylindrical side wall portion 40, a measuring chamber 50. As best seen in FIG. 2, the weir panel 48 is curved upwardly from a location radially adjacent the annular shoulder or step 16 and drain hole 46, to a location adjacent the open upper end of the inner cylindrical side wall portion 40. The panel 48 is also provided with a chord-shaped weir opening 52 at the low end of the panel, radially adjacent the drain hole 46. The weir opening 52 includes an arcuate edge 54 which parallels the cylindrical portion 40, and a straight weir edge 56, lying well to the radial outside of a horizontal center line CL through the cap in the plane of the shoulder 16, and parallel to the edge 56 and hinge 26.

Before describing a preferred use of the above described cap, it is noted that when the top 24 of the cap 10 is closed, the radially inner skirt 30 establishes a friction fit within the inner cylindrical portion 40 as best seen in FIG. 2, while the radially outer skirt 32 snaps into engagement with the groove 14 in the outer cylindrical portion 12. This arrangement provides an effective liquid tight seal. Again, it will be appreciated that various other engagement schemes for the top and cap body may be adopted, and the specific arrangement described here is merely exemplary.

In use, the container 11, with the top 24 closed, is tilted as shown in FIG. 3, so that liquid within the container will spill over the weir edge 56, through weir opening 52 and into the measuring chamber 50. The clear plastic construction allows the user to fill the chamber 50 until the liquid level reaches the desired volume indicator 58 formed or printed on the top surface 28 (these indicators may also extend axially along the outer cylindrical portion 12 if desired). Note that when tilted as shower in FIG. 3, liquid contents will flow through the weir opening 52 but not through the drain hole 46 which has been located to prevent an undesirable situation where liquid contents would flow into the area between cylindrical portion 12 and 40 during the measuring stage. Once the precisely measured amount of liquid contents has been transferred to the chamber 50, the container 11 may be returned to a horizontal orientation as shown in FIG. 4. In this position, no additional liquid contents will flow over the weir edge 56 and through the weir opening 52 due to the relative heights of the liquid level L within the container 11, and the weir edge 56. From this position, the top 24 is opened, and the precisely measured amount of liquid will flow easily out of the chamber 50. The flowing action is greatly enhanced by the curved configuration of the weir panel 48. In other words, by curving the weir panel 48 in the manner previously described, all of the measure liquid will flow out of the cap as though the container itself were tilted well beyond the horizontal position, even though the container 11 remains horizontal as shown in FIG. 4.

After the liquid contents have been dispensed, the container 11 will be returned to an upright position. Any residual liquid contents which would normally run down the exterior of an otherwise conventional cap, will now run down the exterior surface of the inner cylindrical side wall portion 40, (between the inner and outer portions 12 and 40) and onto the ramp surface 42. From here, the residual liquid will flow downwardly to the drain hole 46 and back into the container 11. In addition, the inner skirt 30 catches any excess liquid on the underside of the cap during discharge of the measured amount, thus precluding dripping of such excess liquid. When the top is reclosed, this excess liquid will simply run back into the measuring chamber, through the weir opening and back into the container.

Figure 6:
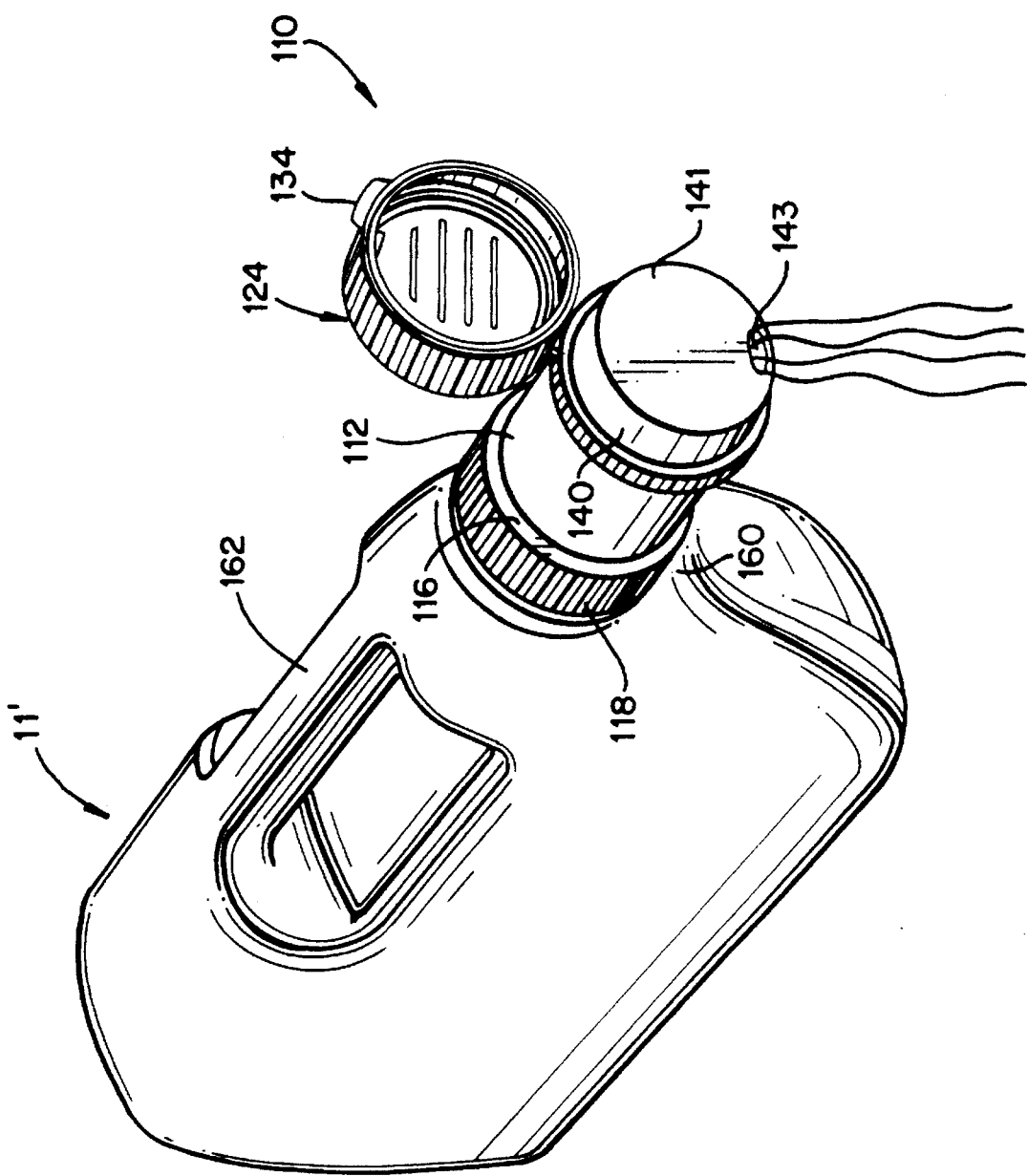
FIG. 6 is a perspective view of the cap illustrated in FIG. 6, attached to an exemplary container construction.
Figure 9:
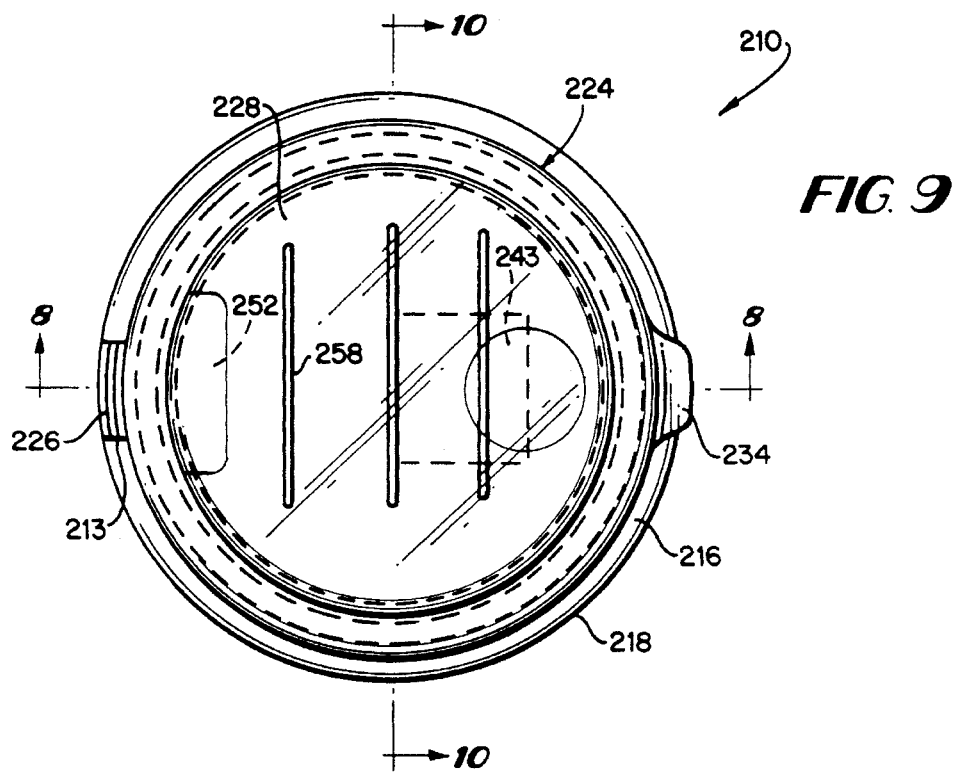
FIG. 9 is a top plan view of the cap illustrated in FIG. 7.

With reference now to FIGS. 5 and 6, a cap construction in accordance with a second exemplary embodiment of the invention is illustrated. Specifically, the cap 110 includes a radially outer cylindrical side wall 112 which terminates at an open upper end with an annular indent or shoulder 114 (or projection or similar construction allowing a snap close fit for the recloseable top). The side wall 112 is, as in the previously described embodiment, provided with an annular step or shoulder 116 which establishes a larger diameter for the lower portion 118, accommodating an interior screw thread 120 which enables the cap 110 to be removably secured to a container 11'.

The integral recloseable top 124 is pivotally secured to the side wall 112 at its uppermost edge by an integral or living hinge 126. The top 124 is formed with a top surface 128, a radially inner annular projection 130 and an outer annular skirt 132, both of which depend from the top surface 128. The radially outer skirt terminates at a radially outwardly directed lift tab or flange 134 and, it will be appreciated that the lower tree edge of the radially outer annular skirt is provided with a complementary surface for snap fit interaction with the annular indent or shoulder 114 at the upper end of the radially outer cylindrical side wall 112. The recloseable top 124 is also provided with a rounded depressed portion 125 for a purpose described further below. The radially inner annular projection 130 of the recloseable top, is short in its axial extent and is adapted to frictionally engage an inner cylindrical side wall 140 as described in detail below.

The inner cylindrical side wall portion 140 of the cap 110 has an end panel 141 which substantially closes the upper end of the radially in wall portion 140, but includes a rounded dispensing aperture 143. The upper end of the radially inner side wall portion 140 is also provided with an uppermost radially outwardly extending, annular projection 145 adapted for snap fit engagement with the radially inner annular skirt 132 of the recloseable top. Thus, the recloseable top 124 is adapted for snap fit interaction (1) about the radially inner cylindrical side wall 140; (2) about the annular groove or projection 114 on the radially outer cylindrical side wall and (3) within the rounded opening 143 of the end panel 141.

The inner and outer cylindrical portions 112 and 140 are connected by an integral ramp surface 142 substantially adjacent the step or shoulder 116 in a substantially identical manner as in the previously described embodiment. Thus, the ramp surface 142 extends annularly from a high point in opposite directions to a low point at a diametrically opposed drain hole 146, as in the previously described embodiment.

Within the inner cylindrical portion 140, a weir panel insert 148 is provided which is circular in plan, and which has a partial cylindrical side wall portion 149 which varies in axial length about its circumference from a maximum axial extent on the right hand side of FIG. 5, to a minimum axial extent along the left hand side of FIG. 5. This insert 148 may be held in place within the radially inner cylindrical side wall 140 by friction fit, snap fit, ultrasonic welding, or other suitable means.

The weir panel 148 including weir opening 152 and measuring chamber 150 are otherwise similar to the previously described embodiment, and incorporates volumetric indicia 158 on the top surface 128 (and optionally, along adjacent skirt portions). The significant difference here, is that when the recloseable top 124 is in the open position to discharge the measured amount from the chamber 150, a more controlled discharge is enabled through the utilization of a smaller discharge opening 143.

With reference now to FIG. 6, the cap 110 is shown attached to a plastic container 11' of a type eminently suitable for use with the cap 110. In this regard, note that the container neck 160 is offset from the longitudinal axis of the container, and that a handle 162 is formed integral with the container and in substantial alignment with the cap. In this way, the natural lifting and tilting direction of the container is such that most of the liquid contents will remain on the "low side" while air will enter in the "high side" via the drain hole 146 to enable easy flow of liquid between the container and the measuring chamber 150, and ultimately from the discharge opening 143.

With reference now to FIGS. 7–16, a third exemplary embodiment of the invention is illustrated. The cap 210 includes a radially outer cylindrical side wall 212 which terminates at an open upper end with an annular indent or shoulder 214 which, as in the previously described embodiment, allows a snap close fit for the recloseable top. The side wall 212 is also provided with an annular step or shoulder 216 which establishes a larger diameter for the lower portion 218 of the cap. This lower portion 218 is formed with an interior screw thread 220 which enables the cap 210 to be removably secured to a container (not shown) in conventional fashion.

Figure 13:
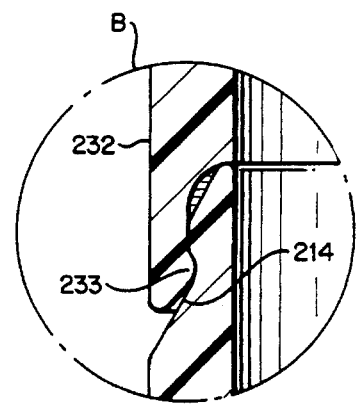
FIG. 13 is an enlarged detail B taken from FIG. 8.
Figure 12:
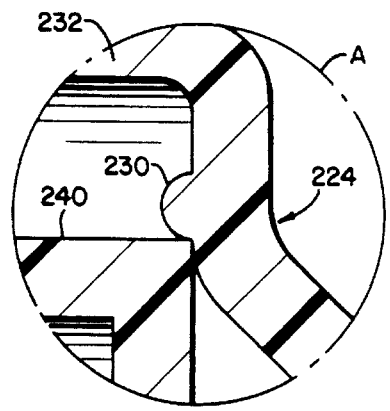
Figure 15:
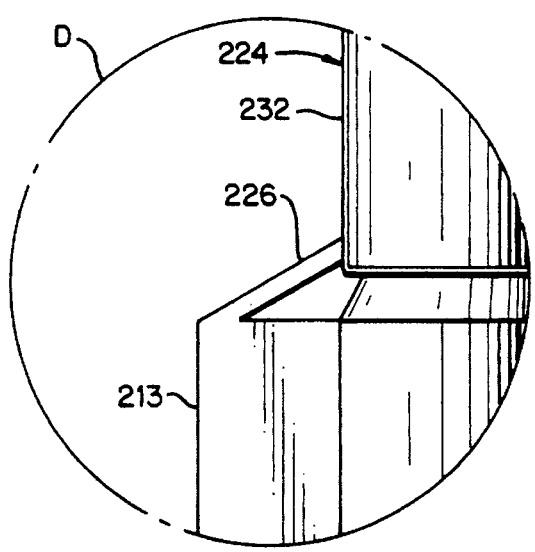
FIG. 15 is an enlarged detail D taken from FIG. 7.

The integral recloseable top 224 is pivotally secured to the side wall 212 at its uppermost edge by an integral or living hinge 226 best seen in FIGS. 7 and 15 (Detail D). More specifically, the hinge 226 connects to a thickened vertical rib 213 integrally formed in the side wall 212. The top 224 is formed with a top surface 228, a radially inner annular projection 230 and an outer annular skirt 232, both of which depend from the top surface 228. The radially outer skirt 232 terminates at a radially outwardly directed lift tab or flange 234 which is diametrically opposite the integral hinge 226. With reference to FIGS. 8 and 13 (Detail B), it will be appreciated that the lower tree edge of the radially outer annular skirt 232 is provided with a complementary surface 233 for snap fit interaction with the indent or shoulder 214. The recloseable top 224 is also provided on its interior surface with an open ended tubular projection 225 for a purpose described below. With specific reference to FIGS. 10 and 12 (Detail A), the radially inner annular projection 230 of the recloseable top is short in the axial direction and is adapted to frictionally engage an inner cylindrical side wall 240.

Figure 10:
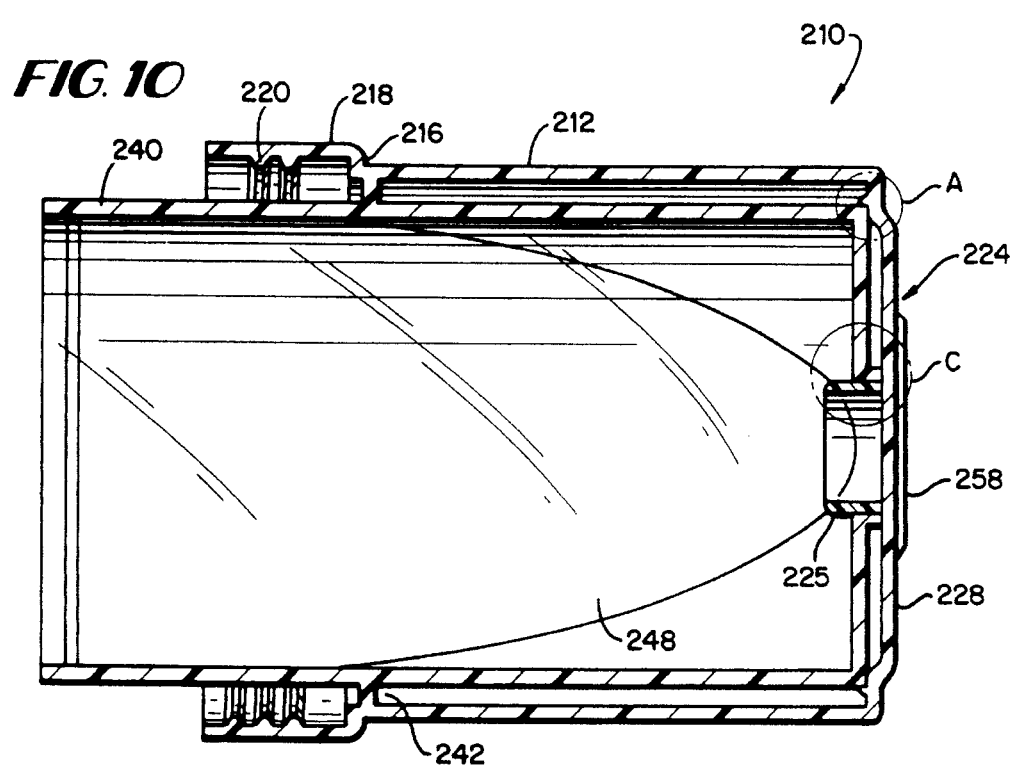
FIG. 10 is a section view taken along the line 10—10 of FIG. 9.
Figure 14:
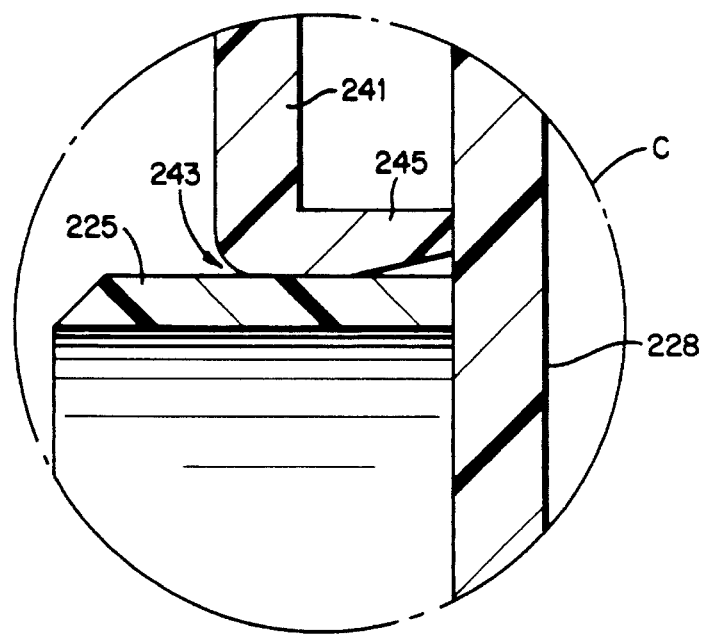
FIG. 14 is an enlarged detail C taken from FIG. 10.
Figure 16:
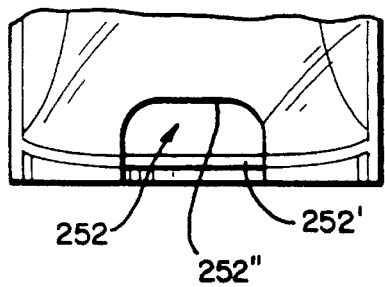
FIG. 16 is a partial end elevation taken in the direction of arrow E in FIG. 8.

The inner cylindrical side wall portion 240 of the cap 210 has an end panel 241 which substantially closes the upper end of the radially inner side wall portion 240, but is also formed with a round dispensing aperture 243, as defined by an upstanding rim 245. Dispensing aperture 243 is sized to receive in friction fit engagement, the tubular projection 225 formed on the underside of the top surface 228 to thereby seal the dispensing aperture when the top is in the closed position. It should be noted also that the underside of top surface 228 engages the upper edge of the rim 245. This arrangement is best seen in FIGS. 8, 10 and 14 (Detail C).

The inner and outer cylindrical portions 212 and 240 are connected by an annular, integral ramp surface 242 substantially adjacent the step or shoulder 216 as in the previously described embodiments. The ramp surface 242 extends annularly from a high point in opposite directions to a low point at a diametrically opposed drain hole 246.

Figure 11:
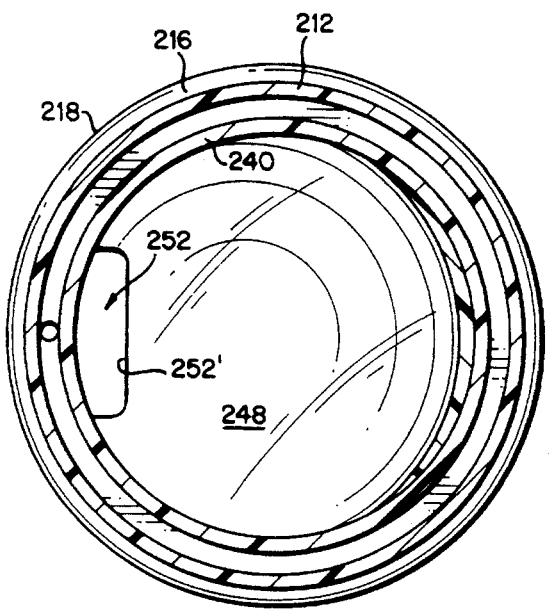
FIG. 11 is a section taken through the line 11—11 of FIG. 7.

Within the inner cylindrical portion 240, there is provided a weir panel 248 which is circular in plan, with a partial cylindrical side wall 249 which varies in axial length about its circumference from a minimum axial extent on the left hand side of FIG. 8 to a maximum axial extent on the right hand side of FIG. 8. This insert 248 may be held in place within the radially inner cylindrical side wall 240 by friction fit, snap fit, ultrasonic welding or other suitable means. The weir panel 248 and a portion of the inner cylindrical portion 240 combine to form a weir opening 252 which is best seen in FIGS. 8, 9, 11 and 16. Thus, a substantially horizontal portion of the weir panel is cut out as best seen in FIG. 11 to form a first portion 252' of the weir panel 252. At the same time, an adjacent vertical portion of the inner cylindrical side wall 240 is cut out as shown at 252" in FIG. 16 to form the weir opening 252 having both horizontal and vertical components. With further reference to FIG. 8, a round vent hole 264 is provided in the inner cylindrical side wall 240 in substantially vertical alignment with the weir opening component 252".

As best appreciated from FIG. 8, it can be seen that the inner cylindrical side wall 240 as well as the weir panel 248 projects downwardly beyond the lowermost edge of the lower portion 218 of the depending skirt. This provides for an enlarged volumetric measuring chamber 250 as compared to the corresponding chambers in the earlier described embodiments. As a result, of course, part of the measuring chamber including the inner cylindrical wall 240 in at least a portion of the weir panel 248 will project downwardly into the neck of the container.

It is significant that during use of the container measuring cap as illustrated in FIGS. 7–16, that the weir edge 256 lies closer to the adjacent cylindrical side wall 240 than in the previously described embodiments. This means that during pouring, the weir edge 256 will enable a greater degree of tilting even after the measured amount has been transferred into the measuring chamber 250 without then also spilling additional unwanted material into the measuring chamber. In other words, the damming efficiency of the weir edge 256 is increased. At the same time, the enlarged weir opening achieved by cut-out portion 252" of the inner cylindrical wall does not interfere with the free flow of material into the measuring chamber. The other significant aspect of this embodiment of the invention is the presence of vent hole 264 vertically aligned with the weir opening 252. During the initial tilting of the container, with the top 224 in its closed position, and during transfer of a measured amount of liquid content into the measuring chamber 250, the air present within the cap will be able to flow through the vent aperture 264, through the radial space between the inner and outer cylindrical side walls 212 and 240, and into the container to enable flow of material into the measuring chamber. The vent 264 will also be effective in the event the top 224 is simply opened and tree flow of liquid content from the container directly out of the cap is desired. Thus, there will be a free flow of air through the open top, and through the vent hole 264 and/or the vertical cut-out portion 252" of weir opening 252 into the container to enhance the flow of liquid material out of the container.

As in the previously described embodiments, volumetric indicia may be provided on one or both of the cap top surface 228 and depending skirt 232.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dispenser cap for discharging measured amounts of liquid contents from a container comprising:

an outer cylindrical side wall having upper and lower portions, said lower portion provided with interior surface means for securing the cap to a container;

an inner cylindrical side wall spaced radially from said outer cylindrical side wall, to define an annular chamber therebetween, said inner cylindrical side wall at least partially defining a dispensing chamber and wherein said inner and outer cylindrical side walls are connected by an annular, inclined ramp surface extending between high and low points, a drain opening provided in said ramp surface at said low point;

a weir panel within said inner cylindrical side wall, configured to provide a weir opening between the container and the dispensing chamber; and a recloseable top including an outer peripheral skirt adapted to be telescoped over and secured to said outer cylindrical side wall wherein said top is pivotally secured to said outer cylindrical side wall radially adjacent but axially spaced from said weir opening.

2. The dispenser cap of claim 1 wherein volumetric indicia are provided on said recloseable top.

3. The dispenser cap of claim 1 wherein said inner and outer cylindrical side walls are integrally connected at a location adjacent an annular, horizontal step separating said upper and lower portions of said outer cylindrical side wall.

4. The dispenser cap of claim 1 wherein said weir opening is located radially adjacent said drain opening.

5. The dispensing cap of claim 1 wherein said top includes an inner cylindrical skirt adapted to be frictionally received within said inner cylindrical side wall when the top is closed.

6. The dispensing cap of claim 1 wherein said inner cylindrical side wall extends axially beyond said outer cylindrical side wall.

7. The dispensing cap of claim 1 wherein said cap is made of a transparent plastic material.

8. The dispenser cap of claim 1 wherein said cap is of unitary, one-piece construction.

9. The dispenser cap of claim 1 wherein the weir panel is formed as a removable insert.

10. The cap of claim 9 wherein said recloseable top is pivotally secured to said outer cylindrical side wall at a location radially adjacent but axially displaced from said weir opening.

11. The cap of claim 10 wherein said inner cylindrical side wall is substantially closed at its upper end, with the exception of a discharge opening located in substantially diametrically opposed relation to said location.

12. The cap of claim 11 wherein said recloseable top is formed with a downwardly extending projection adapted to seal said discharge opening when said recloseable top is in the closed position.

13. The cap of claim 10 wherein a vent aperture is provided in said inner cylindrical side wall adjacent said location.

14. A dispenser cap for discharging measured amounts of liquid contents from a container comprising:

an outer cylindrical side wall having upper and lower portions, said lower portion provided with interior surface means for securing the cap to a container;

an inner cylindrical side wall spaced radially from said outer cylindrical side wall;

a weir panel within said inner cylindrical side wall, configured to provide a weir opening between the container and the dispensing chamber; and a recloseable top including an outer peripheral skirt adapted to be telescoped over and secured to said outer cylindrical side wall wherein said top is pivotally secured to said outer cylindrical side wall radially adjacent but axially spaced from said weir opening; wherein said weir panel extends from said weir opening upwardly to an upper edge of said inner cylindrical side wall diametrically opposite said weir opening.

15. The dispenser cap of claim 14 wherein the inner cylindrical side wall is substantially closed at its upper end, with the exception of a discharge opening located radially adjacent a highest portion of said weir panel.

16. An anti-drip, measuring dispenser cap for containers with liquid contents comprising:

an outer cylindrical side wall;

an inner cylindrical side wall sp iced radially inwardly of said outer cylindrical side wall and connected thereto by an inclined, annular ramp surface having a drain opening therein;

a weir panel within said inner cylindrical side wall substantially closing a lower portion of said inner cylindrical side wall with the exception of a weir opening provided therein, closely adjacent a peripheral portion of said panel, said weir opening establishing fluid communication between the container and the cap; wherein said inner cylindrical side wall and said weir panel define a measuring chamber; and a recloseable top pivotally secured to said outer cylindrical side wall, which, when closed, further defines said measuring chamber.

17. The cap of claim 16 wherein said weir opening further includes a cut out portion of said inner cylindrical side wall.

18. The cap of claim 16 wherein said inner cylindrical side wall projects downwardly below said outer cylindrical side wall.

19. The cap of claim 16 whereto said measuring chamber extends below said outer cylindrical side wall.

* * * * *